Figure 1:
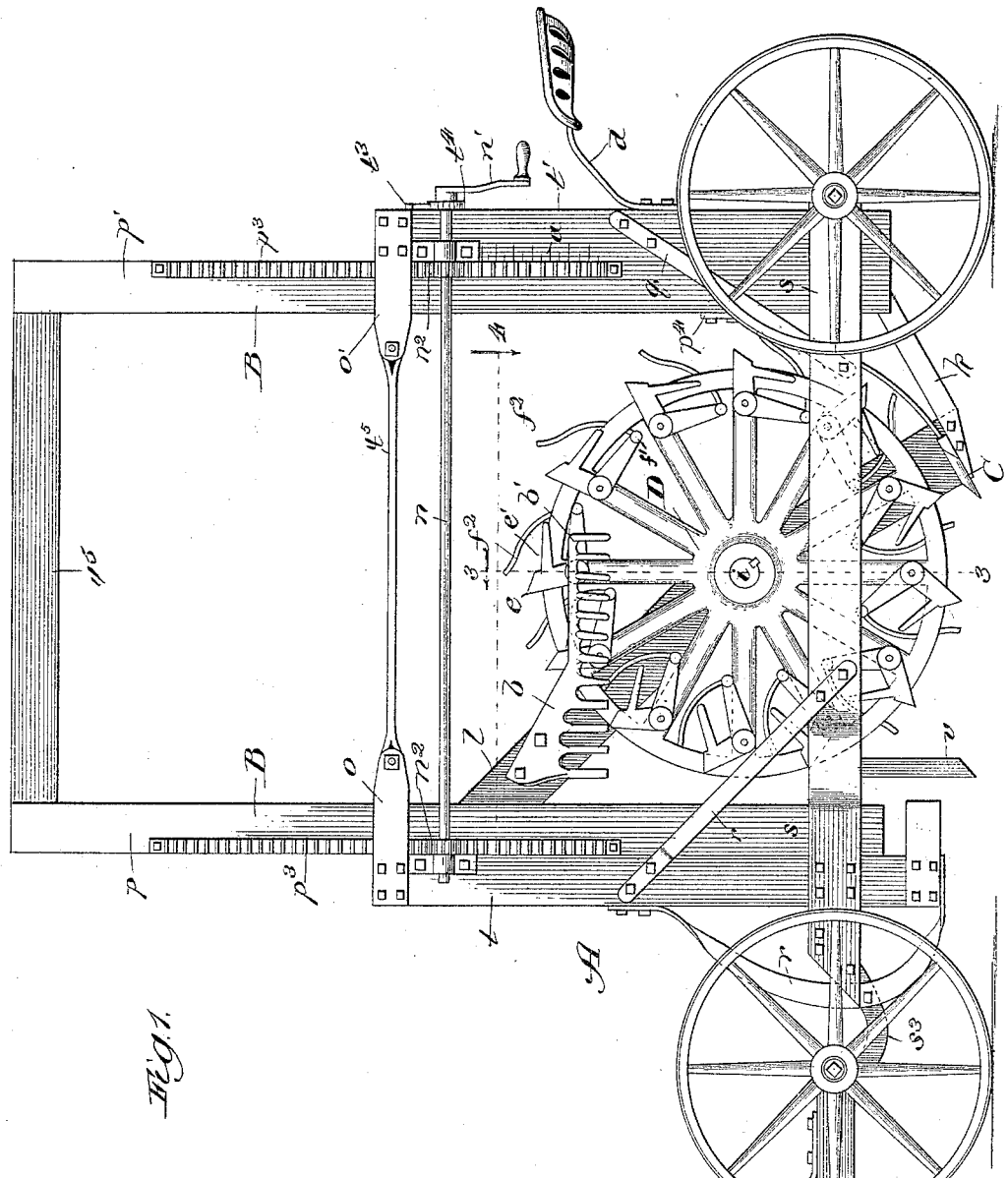

(No Model.) 3 Sheets—Sheet 1.

A. JOHNSON.
DIGGING MACHINE.

No. 458,714. Patented Sept. 1, 1891.

Witnesses:
Chas. E. Gaylord,
Clifford H. White

Inventor:
Andrew Johnson,
By Dyrenforth & Dyrenforth
Attys

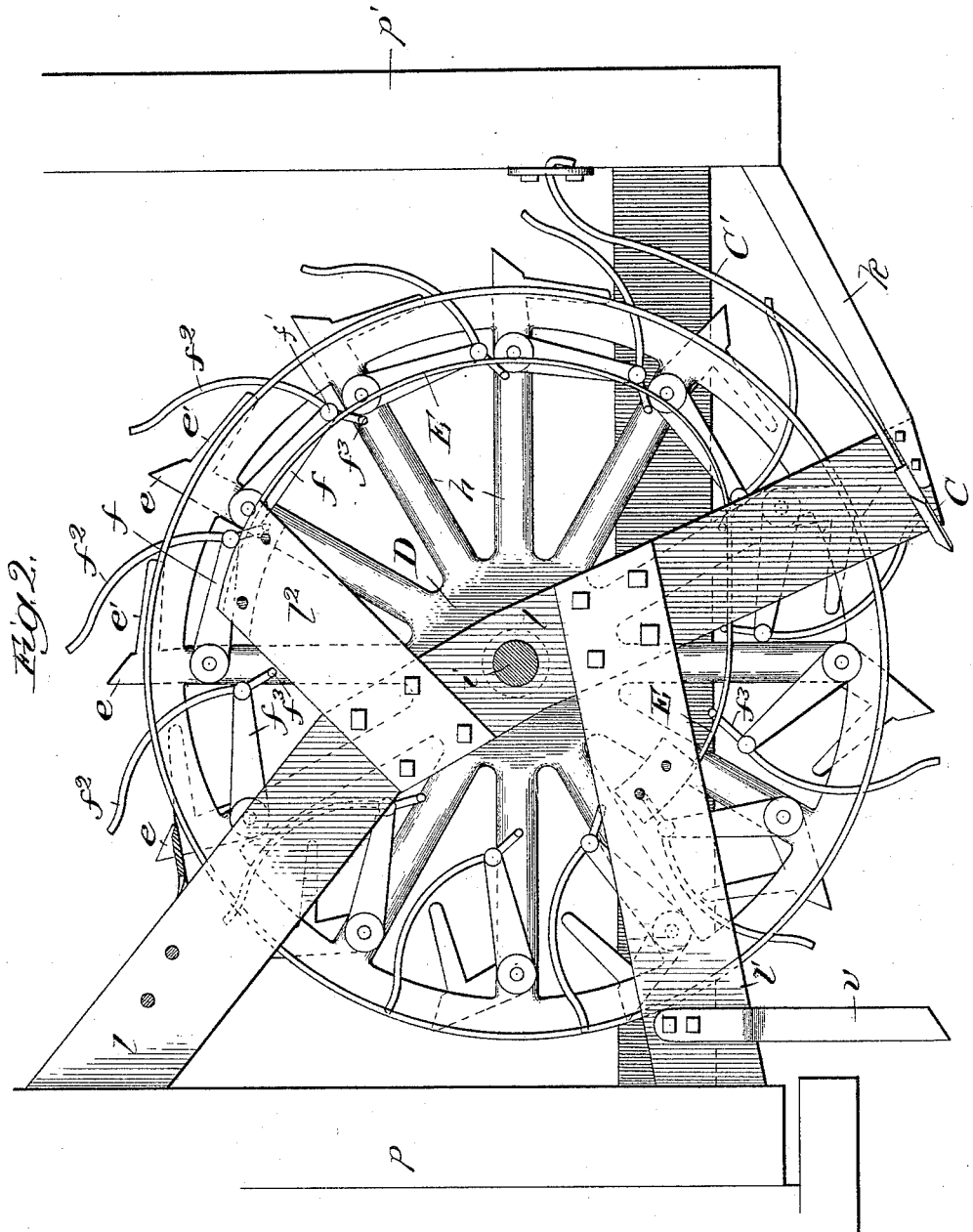

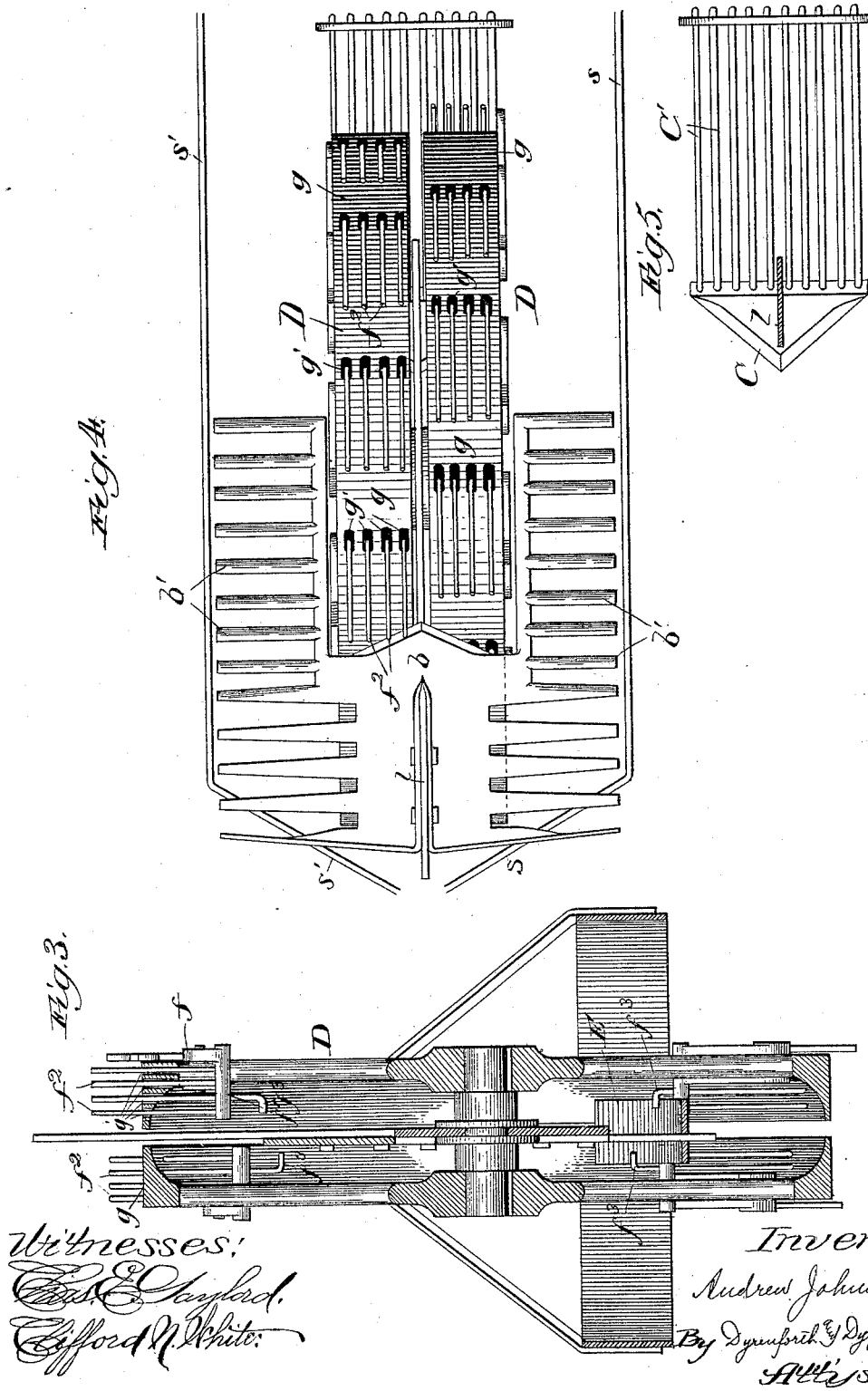

UNITED STATES PATENT OFFICE.

ANDREW JOHNSON, OF CHICAGO, ILLINOIS.

DIGGING-MACHINE.

SPECIFICATION forming part of Letters Patent No. 458,714, dated September 1, 1891.

Application filed March 25, 1891. Serial No. 386,321. (No model.)

*To all whom it may concern:*

Be it known that I, ANDREW JOHNSON, a citizen of the United States, residing at Chicago, in the county of Cook and State of Illinois, have invented a new and useful Improvement in Digging-Machines, of which the following is a specification.

My object is to provide a machine of improved construction for use in digging trenches, and more especially for making drain-tile ditches.

In the drawings, Figure 1 is a view in side elevation of my improved machine, certain hidden parts being indicated by dotted lines. Fig. 2 is an enlarged broken sectional view showing the inner side of one of the elevating-wheels; Fig. 3, an enlarged section taken on line 3 3 of Fig. 1 and viewed in the direction of the arrow; Fig. 4, a broken top plan view taken from line 4 of Fig. 1 and enlarged, and Fig. 5 a sectional plan view of the plow detail.

A is the main frame of the machine, mounted upon wheels to travel and comprising a forward standard $t$ and rear standard $t'$, held together in fixed relation at the top by a tie-rod $t^5$, and $s$ $s'$ are side bars of the frame joined together near their forward ends to opposite sides of a supporting-extension $s^3$, which is pivotally connected with the axle of the forward wheels of the vehicle. The forward standard $t$ is held between the side bars and braced in position by the braces $r$. At their opposite ends the side bars $s$ $s'$ are firmly secured to the axle of the rear wheels of the vehicle. The rear standard $t'$ is secured at its lower end to the axle of the rear wheels of the vehicle, and is held firmly in position by brace-rods $q$, which extend to it at opposite sides from the side bars.

B is a vertically-movable frame comprising two uprights $p$ and $p'$, the forward one of which $p$ extends through a guide-loop $o$ and slides against the standard $t$, and the rear upright $p'$ extends through a guide-loop $o'$ and slides against the rear standard $t'$, the uprights being connected together at their tops by a cross-bar $t^5$. A shaft $n$, journaled toward opposite ends in bearings, respectively, on the standards $t$ and $t'$, is provided at its rear end with a crank or like turning means $n'$, and between its ends with pinions $n^2$, which mesh with racks $p^3$ on the uprights of the frame B. By turning the crank $n'$ the frame B may be raised and lowered in the frame A and held at any desired elevation by the engagement of a pawl $t^3$ on the standard $t'$, with a ratchet $t^4$ on the shaft $n$.

C is a plow or scraper, the blade of which is pointed, as shown in Fig. 5. The plow C is secured to the lower end of a support $l$ in the form of a plate which extends downward and backward from the upright $p$ and connects with a brace-plate $k$, extending to it below the plow from the upright $p'$. Extending in an upward direction from the rear side of the plow are curved rods C', affording a grated platform, the rods being secured at their upper ends to a cross-plate $p^4$ on the upright $p'$. The plate $l$ is connected toward its lower end with the lower end of the standard $p$ by a brace-plate $l'$, and upon the plate $l$, in the position shown, is an upward-extending plate $l^2$.

D is a wheel formed in two similar parts mounted at opposite sides of the plates $l$, $l'$, and $l^2$ upon a shaft $i$, journaled in the plate $l$. The parts should be keyed to the shaft $i$, whereby they may rotate together, and they form practically one wheel. Each part of the wheel D is formed with spokes $h$ and a flat-faced rim $g$. Upon each spoke $h$ and pivoted on opposite sides thereof adjacent to the rim is an arm $f$, formed of two parallel lengths joined together at their free ends by a cross-piece $f'$, which carries a series of curved fingers $f^2$. The fingers $f^2$ extend through guide-openings $g'$ in the rim of the wheel.

E is a cam comprising a narrow strip of metal bent to the form shown in Fig. 2 and secured at one end upon the side of the plate $l^2$ and at its opposite end upon the side of the plate $l'$. On the free end of each arm $f$ is a hook $f^3$, which extends around the cam E to slide against the inner side of the latter, and the cross-pieces $f'$ of the arms $f$ are arranged to slide upon the outer surface of the cam. Formed integral with each arm $f$ and extending at about a right angle to the latter from its pivoted end on the outer side of the wheel D is an arm $e$, pointed, as shown, at its free end and provided near that end with a plate $e'$, which extends to or nearly to the plane of the fingers $f^2$, carried by the arm. Upon the rear standard $t'$ is a seat $d$ for the operator. Horses are hitched to the vehicle at the tongue $c$ of the latter and the driver sits upon the seat $d$. The driver may raise and lower the frame B, which carries the plow and wheel D in the frame A by turning the crank $n'$, as before described, which is directly at hand. When the machine is not to be operated for digging, the frame B may be elevated in the frame A until the plow and elevating-wheel are raised a desired distance above the ground, so that the vehicle may be drawn from place to place about the country.

In operation, to dig a trench the frame B is lowered until the point of the plowshare extends two or three inches into the ground, which will cause the ends of the arms $e$ and fingers $f^2$ to extend about one or two inches into the ground. As the machine is drawn forward the engagement of the arms $e$ and fingers $f^2$ with the soil will cause the wheel D to be rotated, the engagement of the hooks $f^3$ with the inner face of the cam E preventing the arms $e$ and fingers $f^2$ from being swung back upon their pivots. As the wheel D rotates, the next succeeding arms $e$ and fingers $f^2$ of the series are brought into contact with the soil, and so on, whereby the rotation of the wheel D is rendered continuous while the machine travels. In the forward movement of the machine the plow scoops up the soil to the depth which it penetrates, and the fingers $f^2$ as they travel backward wipe across the face of the plowshare and carry the soil up the platform C', which describes substantially an arc, of which the shaft $i$ is the center. As the fingers $f^2$ travel upward, the cross-pieces $f'$ of the arms $f$ come into contact with and slide upon the outer face of the cam E, and the fingers are thus forced outward, owing to the shape of the cam, through the openings $g'$ to produce receptacles or scoops which take the soil from the platform C' and carry it upward. Secured to the plate $l$ is a deflecting platform or scraper $b$, extending across the face of the wheel D and carrying at opposite sides of the wheel laterally-extending and downwardly-inclined grated sections $b'$, which may be integral with the platform or separate pieces secured in place. As the soil is carried upward in the scoops afforded by the fingers $f^2$, it is held against dropping from the rim of the wheel by the plates $e'$, which afford sides for the scoops. When the fingers approach the platform $b$, the free ends of the arms $f$ pass the end of the cam E, causing the plates $e'$ and fingers $f^2$ to swing downward on their pivots until the free ends of the fingers descend to or below the surface of the wheel-rim $g$. In case the fingers and arms $e$ do not drop of their own weight far enough to clear the scraper the contact of the arms $e$ with the scraper will swing the parts out of the way. The soil thus drops from the wheel-rim to the grated sections $b'$ or is scraped into the latter by the scraper or platform $b$, whence it falls to the ground on opposite sides of the machine. When the end of the trench is reached, the frame B is raised and the machine turned around to start on the return and the plow and elevator-wheel lowered, as before, until its plow enters the soil at the bottom of the trench, say, two or three inches. The distance to which the frame is to be lowered in each operation may be determined by a scale $a$ upon the standard $t'$ and a suitable mark upon the upright $p'$, which registers with the scale. Secured to the side plates $s$ and $s'$ are colters $v$, which extend down to the plane of the pointed end of the plowshare.

In practice I prefer to afford a wheel B about six feet in diameter, each part having a rim about six inches or more in width. With such a wheel a trench may be dug a foot or more in width and to a depth of four feet, which is usually considered ample for tile-draining. The wheels of the vehicle should be far enough apart to travel along the outer edges of the mounds formed by the soil thrown from the elevator-wheel.

In the use of my improved machine the digging of trenches may be performed very rapidly and the driver has perfect control over its action, and the grated platforms and scoops afforded by the fingers operate by affording comparatively small surfaces for contact with the soil which is thrown upon them to prevent the soil from sticking to any material extent and clogging the machine.

While the construction described is the one I prefer to employ, it may be modified in the matter of details without departing from the spirit of my invention.

What I claim as new, and desire to secure by Letters Patent, is—

1. In a digging-machine, the combination, with the main frame mounted upon wheels, of a vertically-adjustable frame upon the main frame, a plow on the adjustable frame, an elevator-wheel journaled in the adjustable frame, oscillating arms pivoted upon the elevator-wheel, fingers upon the oscillating arms, a deflecting-platform on the adjustable frame, and operating means for the oscillating arms for advancing the fingers beyond and retracting them toward the rim of the elevator-wheel, whereby in the forward movement of the machine the fingers engage the ground to turn the elevator-wheel, scoop the soil from the plow, and deposit it upon the deflecting-platform, substantially as described.

2. In a digging-machine, the combination, with the main frame mounted upon wheels, of a vertically-adjustable frame upon the main frame, a plow on the adjustable frame, an elevator-wheel journaled in the adjustable frame, oscillating arms pivoted upon the elevator-wheel and having extensions $e$, fingers upon the oscillating arms, a deflecting-platform on the adjustable frame, and operating means for the oscillating arms for advancing the fingers and extensions $e$ beyond and retracting them toward the rim of the elevator-wheel, whereby in the forward movement of the machine the extensions e engage the ground to turn the elevator-wheel and the fingers scoop the soil from the plow and deposit it upon the deflecting-platform, substantially as described.

3. In a digging-machine, the combination, with the main frame mounted upon wheels, of a vertically-adjustable frame upon the main frame, a plow and a support l on the adjustable frame, an elevator-wheel in two parts journaled on opposite sides of the support l, reciprocating scoops at the rim of the elevator-wheel, ground-engaging means upon the elevator-wheel to rotate the said wheel in the progress of the machine, and a deflecting-platform on the adjustable frame, whereby in the forward movement of the machine the elevator-wheel is rotated and the scoops take the soil from the plow and deposit it on the deflecting-platform, substantially as described.

4. In a digging-machine, the combination, with the main frame mounted upon wheels, of a vertically-adjustable frame upon the main frame, a plow and an elevator-wheel supported by the adjustable frame, reciprocating scoops at the rim of the elevator-wheel, ground-engaging means on the elevator-wheel to rotate the said wheel in the progress of the machine, and a platform b on the adjustable frame extending diagonally across the rim of the elevator-wheel near the said rim and at the upper side thereof and provided with outward and downward inclined grated sections b', extending along opposite sides of the elevator-wheel, whereby in the forward movement of the machine the elevator-wheel is rotated and the scoops take the soil from the plow and deposit it on the platform, by which the soil is deflected to opposite sides of the elevator-wheel, substantially as described.

5. In a digging-machine, the combination, with the main frame mounted upon wheels, of a vertically-adjustable frame upon the main frame, an elevator-wheel supported by the adjustable frame, reciprocating fingers at the rim of the elevator-wheel, reciprocating mechanism for the fingers operating alternately to retract the fingers toward the said rim and to advance the fingers therefrom to afford scoops, ground-engaging means on the elevator-wheel to rotate the said wheel in the progress of the machine, a plow supported on the adjustable frame, a grated platform C', extending upward and backward from the plowshare, and a deflecting-platform on the adjustable frame, whereby in the forward movement of the machine the elevator-wheel is rotated and the scoops afforded by the reciprocating fingers scrape the soil from the plowshare to the grated platform C' and carry it thence to the deflecting-platform, substantially as described.

ANDREW JOHNSON.

In presence of—
J. W. DYRENFORTH,
M. J. FROST.